United States Patent
Krishnaswamy et al.

(10) Patent No.: US 8,923,147 B2
(45) Date of Patent: Dec. 30, 2014

(54) METHOD AND APPARATUS FOR FILTERING AND PROCESSING RECEIVED VEHICLE PEER TRANSMISSIONS BASED ON RELIABILITY INFORMATION

(75) Inventors: Dilip Krishnaswamy, San Diego, CA (US); Xinzhou Wu, Monmouth Junction, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 514 days.

(21) Appl. No.: 13/252,084

(22) Filed: Oct. 3, 2011

(65) Prior Publication Data
US 2013/0083679 A1    Apr. 4, 2013

(51) Int. Cl.
| | |
|---|---|
| H04W 4/12 | (2009.01) |
| H04W 24/00 | (2009.01) |
| H04L 29/08 | (2006.01) |
| G08G 1/09 | (2006.01) |
| H04L 1/00 | (2006.01) |

(52) U.S. Cl.
CPC .............. *H04L 67/322* (2013.01); *G08G 1/093* (2013.01); *H04L 1/0082* (2013.01); *H04L 67/12* (2013.01)
USPC ....................................... 370/252

(58) Field of Classification Search
CPC ....... H04L 67/322; H04L 1/0082; H04L 1/12; G08G 1/093
USPC ....................................... 370/252
See application file for complete search history.

(56) References Cited

U.S. PATENT DOCUMENTS

| | | | | |
|---|---|---|---|---|
| 5,771,459 | A * | 6/1998 | Demery et al. | 455/517 |
| 5,828,835 | A * | 10/1998 | Isfeld et al. | 709/200 |
| 6,985,089 | B2 * | 1/2006 | Liu et al. | 340/903 |
| 7,129,891 | B2 | 10/2006 | Meunier | |
| 7,333,026 | B2 * | 2/2008 | Hunzinger | 340/903 |
| 7,352,291 | B2 | 4/2008 | Reumerman | |

(Continued)

FOREIGN PATENT DOCUMENTS

EP    1876771 A1    1/2008

OTHER PUBLICATIONS

Suthaputchakun et al., "Priority Based Inter-Vehicle Communication in Vehicular Ad-Hoc Networks using IEEE 802.11e", Apr. 22-25, 2007, Vehicular Technology Conference, 2007. VTC2007—Spring. IEEE 65th, p. 2595-2599.*

(Continued)

*Primary Examiner* — Hassan Kizou
*Assistant Examiner* — Amy Ling
(74) *Attorney, Agent, or Firm* — Jeffrey D. Jacobs

(57) ABSTRACT

Methods and devices for processing and retransmitting highway communication system transmissions include determining a reliability of a received message and including an indication of the reliability in retransmitted transmissions. Reliability of received messages may be based on a signal strength of the received peer transmission, comparison of the signal strength to a distance to the transmitter based on message contents, the age of the received message, the signal quality of the received message, and other parameters. An indication of the determined reliability may be included in retransmissions of the message to enable other vehicles and receiver units in the highway communication system to benefit from the reliability determination. Message reliability may be used as part of prioritizing messages for processing. Messages may be processed according to priority so that high priority messages are processed before lower priority messages.

80 Claims, 10 Drawing Sheets

(56) References Cited

U.S. PATENT DOCUMENTS

| | | | |
|---|---|---|---|
| 8,194,559 B2* | 6/2012 | Chun et al. | 370/252 |
| 2003/0064718 A1 | 4/2003 | Haines et al. | |
| 2004/0127226 A1* | 7/2004 | Dugad et al. | 455/450 |
| 2005/0060365 A1* | 3/2005 | Robinson et al. | 709/203 |
| 2007/0001869 A1 | 1/2007 | Hunzinger | |
| 2007/0063875 A1 | 3/2007 | Hoffberg | |
| 2009/0161629 A1* | 6/2009 | Purkayastha et al. | 370/331 |
| 2009/0161644 A1* | 6/2009 | Suzuki et al. | 370/341 |
| 2009/0234859 A1 | 9/2009 | Grigsby et al. | |
| 2010/0019932 A1 | 1/2010 | Goodwin | |
| 2010/0128653 A1* | 5/2010 | Tateson | 370/315 |
| 2011/0004690 A1* | 1/2011 | Georgel et al. | 709/227 |
| 2012/0063305 A1* | 3/2012 | Chiu et al. | 370/230 |
| 2012/0099585 A1* | 4/2012 | Yamamoto et al. | 370/389 |

OTHER PUBLICATIONS

Suthaputchakun et al., "Secure Priority Based Inter-Vehicle Communication MAC Protocol for Highway Safety Messaging", Oct. 17-19, 2007, Wireless Communication Systems, 2007. ISWCS 2007. 4th International Symposium, p. 518-523.*

Suthaputchakun et al., "Military Inter-Vehicle Communication with Message Priority using IEEE 802.11e", Oct. 23-25, Military Communications Conference, 2006. MILCOM 2006. IEEE2006.*

"Intelligent Transport Systems (ITS); Vehicular Communications; Basic Set of Applications; [Part 3: Specifications of Decentralized Environmental Notification Basic Service", ETSI Draft; WG10002-3V211, European Telecommunications Standards Institute (ETSI), 650, Route Des Lucioles; F-06921 Sophia-Antipolis; France, No. V2.1.1, Apr. 29, 2010, pp. 1-40, XP014072999, [retrieved on Apr. 29, 2010] Sections 4-6, Annexes B-C.

"Intelligent Transport Systems (ITS); Vehicular communications; GeoNetworking; Part 4: Geographical addressing and forwarding for point-to-point and point-to-multipoint communications; Sub-part 1: Media-Independent Functionality", Technical Specification, European Telecommunications Standards Institute (ETSI), 650, Route Des Lucioles ; F-06921 Sophia-Antipolis ; France, vol. ITS WG3, No. V1.1.1, Jun. 1, 2011, XP014065694, Sections 7-9, Annex C, E.

International Search Report and Written Opinion—PCT/US2012/000492—ISA/EPO—Feb. 5, 2013.

* cited by examiner

METHOD AND APPARATUS FOR FILTERING AND PROCESSING RECEIVED VEHICLE PEER TRANSMISSIONS BASED ON RELIABILITY INFORMATION

BACKGROUND

1. Field

The present application relates generally to highway communication systems, and more particularly to efficient methods for prioritizing and processing received peer transmissions.

2. Background

Vehicle communication networks that can transmit and receive wireless data have been in development as part of systems to improve safety and relieve congestion on the highways. In such highway communication systems, short wave messages may be exchanged to, from, and between vehicles, and between vehicles and roadside base stations. These peer transmissions may be received by a wireless communication device within a vehicle's on-board processing unit, with the contents of the message used for a variety of safety and driver awareness purposes.

If such highway communication systems are ever deployed, it is expected that a great many messages will be generated and received by each vehicle's on-board communication unit. Such inter-vehicle peer transmissions may be received as frequently as one message per 0.1 second according to some estimates. Some messages may require significant data processing, and as the number of received transmissions increases, the vehicles' processing unit may become inundated. This may increase the amount of time required to process some messages. Thus, in a heavy stream of traffic, critical messages may not be processed in time as processing resources are consumed by non-important messages.

SUMMARY

The various embodiments include methods for filtering and prioritizing peer transmissions received by a vehicle communication unit, determining a message reliability, and including the reliability indication in retransmissions of the message. Methods include receiving peer transmissions in a vehicle communication unit and filtering the peer transmissions in a prompt manner before processing the messages. This filtering may be based on a predetermined criteria to identify high priority messages. The filtering may also rank messages in terms of priority so that high priority messages may be processed before lower priority messages. The embodiment methods also include determining whether the filtered peer transmissions are reliable based on a number of factors. The embodiment methods also include retransmitting the filtered peer messages with an indication of their determined reliability, so that other vehicles receiving the retransmitted messages can benefit from a reliability parameter when assigning priority to receive messages.

In various embodiments, received peer transmissions may be prioritized prior to processing based on information included within a header of the transmitted messages, such as a routing data bit, a MAC identifier, a reliability parameter, or a security identifier, and/or characteristics of the received transmission, such as signal power, Doppler shift of the received transmissions. Received peer transmissions may also be prioritized based on information contained within the received messages, such as a location of the transmitter, an elevation of the transmitter, or a type of message.

In an embodiment, a vehicle processing unit may determine whether a received peer transmission is reliable based upon a number of parameters and considerations, and may embed and indication of the determine reliability in retransmissions of the same message. Reliability of received peer transmissions may be determined by comparing the signal strength of the peer transmission to a predetermined threshold or to an expected signal strength based upon a calculated distance between the vehicle and a reported location of the transmitter obtained from the received message.

In an embodiment, a vehicle receiving a peer transmission including an indication of its reliability may consider that indication in assigning a priority to the message. While received peer transmissions with an indication of unreliability may be given low priority in some circumstances, such messages may be given high priority for processing based upon other information, such as proximity to the transmitter, Doppler shift (such as would indicate that the transmitter is traveling towards the receiving vehicle), and whether the transmitter is within the same plane as the receiving vehicle, which may take into account topographical information.

The various embodiments include a vehicle communication and processing unit including a processor configured with processor-executable instructions to perform operations of the embodiment methods. The various embodiments include vehicle communication and processing systems having means for accomplishing the functions of the various embodiment methods. The various embodiments also include non-transitory processor-readable storage media having stored thereon processor-executable instructions configured to cause a processor of a vehicle processing unit to perform operations of the methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
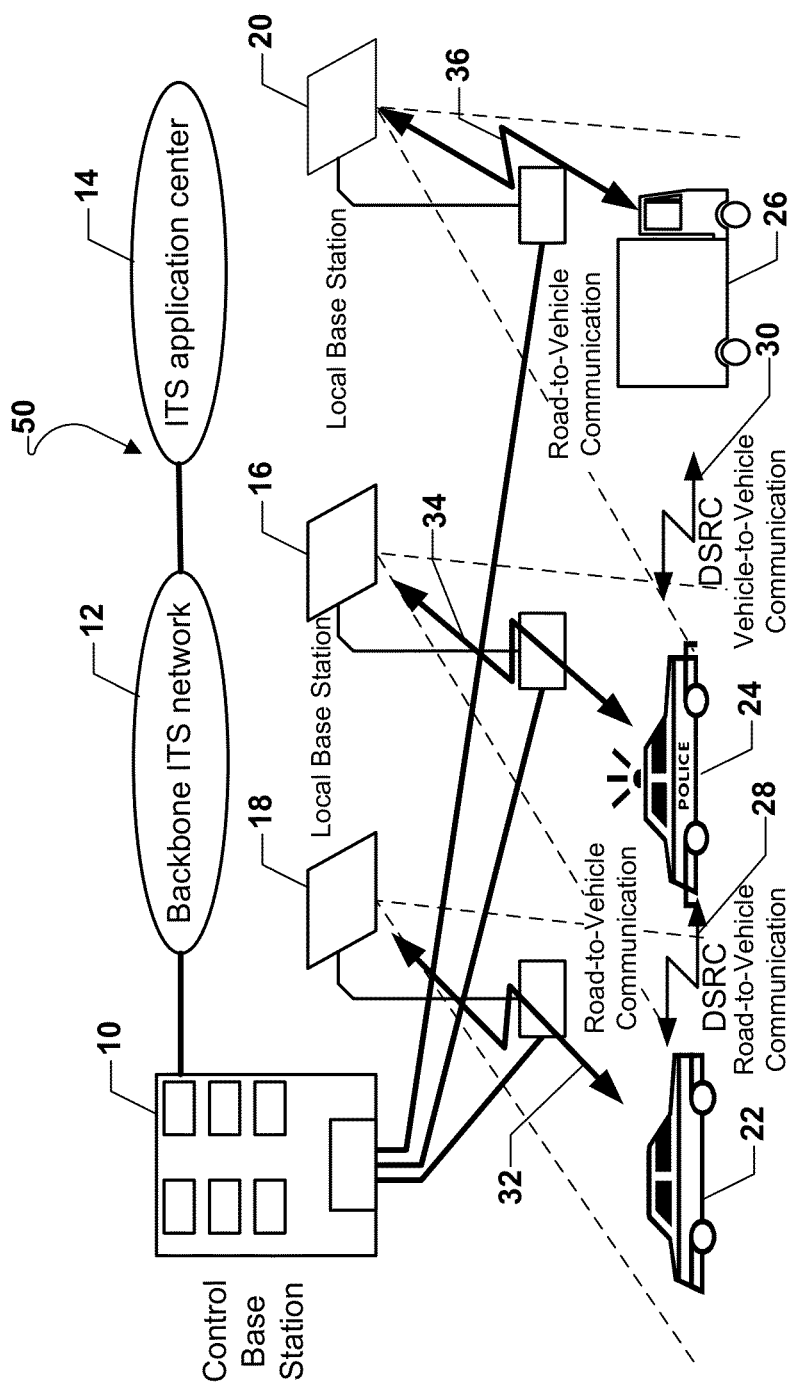
FIG. 1 is a high level diagram of a vehicle communication system illustrating a number of vehicles having onboard vehicle communication units communicating peer transmissions with base stations and other vehicles.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The word "web server" is used herein to mean an application or group of applications capable of receiving a Hypertext Transfer Protocol (HTTP) request and returning an appropriate HTTP response, such as providing a Hypertext Markup Language (HTML) file. A web server may include middleware or an application portion, such as a J2EE® server, an ASP® server, a PHP module, a PERL interpreter, or similar functionality. A web server may also include a data storage portion, such as a database management system (DBMS) or local file store. A web server may be implemented within a conventional server, but in the various embodiments a web server may be also implemented within a receiver device.

The various embodiments solve a technical problem that stands in the way of efforts to have cars and trucks communicate with each other as part of systems to improve traffic flow, prevent accidents, and deliver important information to drivers. In such communication systems, cars and trucks may transmit messages to each other regarding their location, velocity, condition, or driver intentions (e.g., turn signals, brake activation, etc.), with such messages received and transmitted by onboard processing and communication units. Such messaging is referred to herein as peer-to-peer transmissions, or simply peer transmissions. Peer transmissions typically transmit a message having a header portion and a message body portion, including the information to be delivered to receivers.

Highway communication systems, including vehicle-to-vehicle communications systems, offer great potential for solving many of the problems of modern city life as the number of vehicles on the roads increases. It is expected that such systems will enable vehicles to frequently exchange of information regarding their own vehicle, such as its position, speed and direction of travel, as well as information regarding road conditions, weather conditions, and other aspects which may impact safety or route preferences. Such information may be used to supplement a driver's senses, and to provide other information that is of benefit to vehicle operators. In addition to transmitting information regarding their own vehicle, vehicle processing units may also retransmit messages received from others, thereby enabling messages to be transmitted beyond the communication range of the initiating vehicle. Such communication systems may permit drivers to alert others to road hazards, traffic slowdowns, accidents, and approaching emergency vehicles. Such networks may also enable emergency vehicle personnel to alert drivers to their presence, so that drivers can more quickly clear a path.

By receiving such information, each vehicle's processing unit can make determinations regarding the appropriate speed, travel routes, and notifications to the driver. The more information that is communicated, the better the determinations that can be made by each vehicle's processing unit. However, as the number of vehicles on the road increases, such as may occur during rush hour in large cities, the volume of peer transmissions that each vehicle's processing unit must receive and process can pose a daunting challenge to system and hardware designers. It is anticipated that transmissions might be made by every vehicle every 0.1 seconds. Some peer transmission may require extensive processing by the receding vehicle in order to receive the benefit of the message. Consequently, the potential exists that in some circumstances, such as rush-hour in a busy city, vehicle processing units will not be able to process every peer transmission that they are able to receive. If that occurs, there is a risk that urgent messages may not be processed in time to provide the vehicle driver with the appropriate warning.

The various embodiments provide solutions to this problem by enabling received transmissions to be assigned priority and reliability indications so that reliable, higher priority messages can be processed first by the vehicle's processing unit. Message priority and reliability indications may be assigned when new messages are generated based on a number of parameters and information known to the vehicle processing unit. Similarly, received messages may be assigned a priority and reliability indications based upon a number of parameters, including information determined from the message itself and information known to the vehicle processing unit. Additionally, received messages may be assigned a priority value based in part upon a determination of the received message's reliability. This prioritizing of messages may enable the vehicle processing unit to delay processing of messages with low reliability and/or low priority to the receiving vehicle. This sequencing of messages for processing based upon priority and/or reliability can enable the vehicle processing unit to manage high-volume message traffic in a manner that enables the most important messages to be processed immediately. Various mechanisms are disclosed for determining received peer transmission message reliability. The embodiments also include methods and configurations for adding an indication of message reliability to those messages retransmitted by a vehicle's processing unit. In this manner, other vehicles can benefit from the determined message reliability. In particular, receiving vehicles can assign priorities to incoming messages based in part upon the included reliability indication.

In the various embodiments, received peer transmissions may be filtered and prioritized according to predetermined criteria. Vehicle processing units may process the prioritized peer transmissions according to message priority, enabling the units to respond to urgent situations by ignoring or delaying processing of irrelevant messages. In this manner, high priority peer transmissions may be processed before low priority peer transmissions. In various embodiments, the peer transmissions may be filtered by location, signal strength, routing bits, a Media Access Control address (hereinafter "MAC identification"), Doppler shift, and/or two or three dimensional parameters of the peer transmission source (especially with respect to the receiving vehicle).

In the various embodiments, vehicle processing units may also make a determination regarding the received message's reliability based on a number of parameters, and embed a reliability indication into a received message before it is retransmitted to other vehicles. The reliability indication may be included in a header of the retransmitted message to indicate the reliability assigned to the message by retransmitting vehicle. This enables other vehicles to prioritize the retransmitted message. In this manner, all participants in the communication system can benefit from the collective determinations of message reliability.

The peer transmissions may be sorted by the vehicle processing unit into a number of queues for further processing. Such queues may include a queue for high priority messages that may be immediately processed, a queue for low priority or irrelevant messages that may be discarded, a queue for medium priority messages that may be held for processing later (e.g., 1-2 seconds later), and a queue for messages that may be further filtered or require additional processing in order to assign an appropriate priority. By sorting received peer transmissions before they are processed, and processing transmissions in order of priority, processing units can ensure that urgent messages are acted on promptly, and are not delayed by processing of lower priority traffic. This queue organization is for illustrative purposes and more or fewer queues may be implemented within vehicle processing units without departing from the scope of the various embodiments. Also in an embodiment, retransmitted peer transmission messages may include an indication of an appropriate queue into which receiving vehicles can sort the message.

In a further embodiment, vehicle processing units may work in collaboration with information provided by roadside units in order to ensure that the retransmission of messages does not result in the needless proliferation of messages, which would lead to message clutter and bogged down the overall communication system. This may be accomplished by roadside units broadcasting a fractional or probability value to all nearby vehicles which relates to a fraction of the vehicles that should transmit messages in a given time interval or retransmit any given message. This probability value may be determined based upon the local vehicle density in a manner that ensures reliability of retransmission without needless message proliferation. Vehicle processing units receiving the probability values from roadside units may use this information to determine whether to transmit or retransmit given messages by generating a random number and comparing it in some fashion to the received probability value. In this manner, vehicles may be selected at random to transmit new messages or retransmit received messages in a manner that manages wireless transmission volume while ensuring an appropriate level of retransmission is accomplished.

FIG. 1 illustrates an inter-vehicle communication system 50 that includes vehicles 22, 24, and 26 that include on-board processing units. Each vehicle's onboard processing unit transmits and receives peer transmissions 28 and 30 from each other, as well as from roadside transmitters, such as local base stations 20. The communication system 50 may include a control base station 10 that includes an ITS network 12 and an ITS application center 14, which may be connected to a number of local base stations 16, 18, and 20, such as via an optical cable. The local base stations 16, 18, and 20 may broadcast peer transmissions 32, 34, and 36 which can be received by the processing unit in vehicles 22, 24, and 26.

In an embodiment, the communication system 50 may implement a Dedicated Short Range Communications ("DSRC") wireless protocol for all peer transmissions. The DSRC protocol operates in the 5.9 Gigahertz frequency band. DSRC supports direct vehicle-to-vehicle communications over a relatively short distance, such as 100 meters to 300 meters. To enable the effective size of the communication system 50 implemented using the DSRC protocol to be large enough to provide the full potential benefits of inter-vehicle communication systems, it is expected that the system will use inter-vehicle message relaying. This concept, each vehicle may retransmit messages and/or information received from other vehicles so that more distant vehicles can receive that information. In this manner, messages and information may be relayed throughout the communication system by "hopping" from one vehicle to another and from vehicles to roadside units and back to vehicles. With each communication hop, the messages or information is progressively transmitted further away from the originating vehicle, and well beyond the limited distance of the DSRC protocol. As a result, a vehicle 26 observing a condition may relay information regarding the condition to a second vehicle 22 that is beyond the DSRC protocol communication range, with the information hopping from vehicle to vehicle and from vehicle to roadside unit and back to vehicles.

The components portrayed in FIG. 1 may be arbitrarily combined, divided, rearranged or removed entirely from the communication system 50. Also, additional components can be included in the communication system 50, without departing from the scope of the various embodiments.

Figure 2:
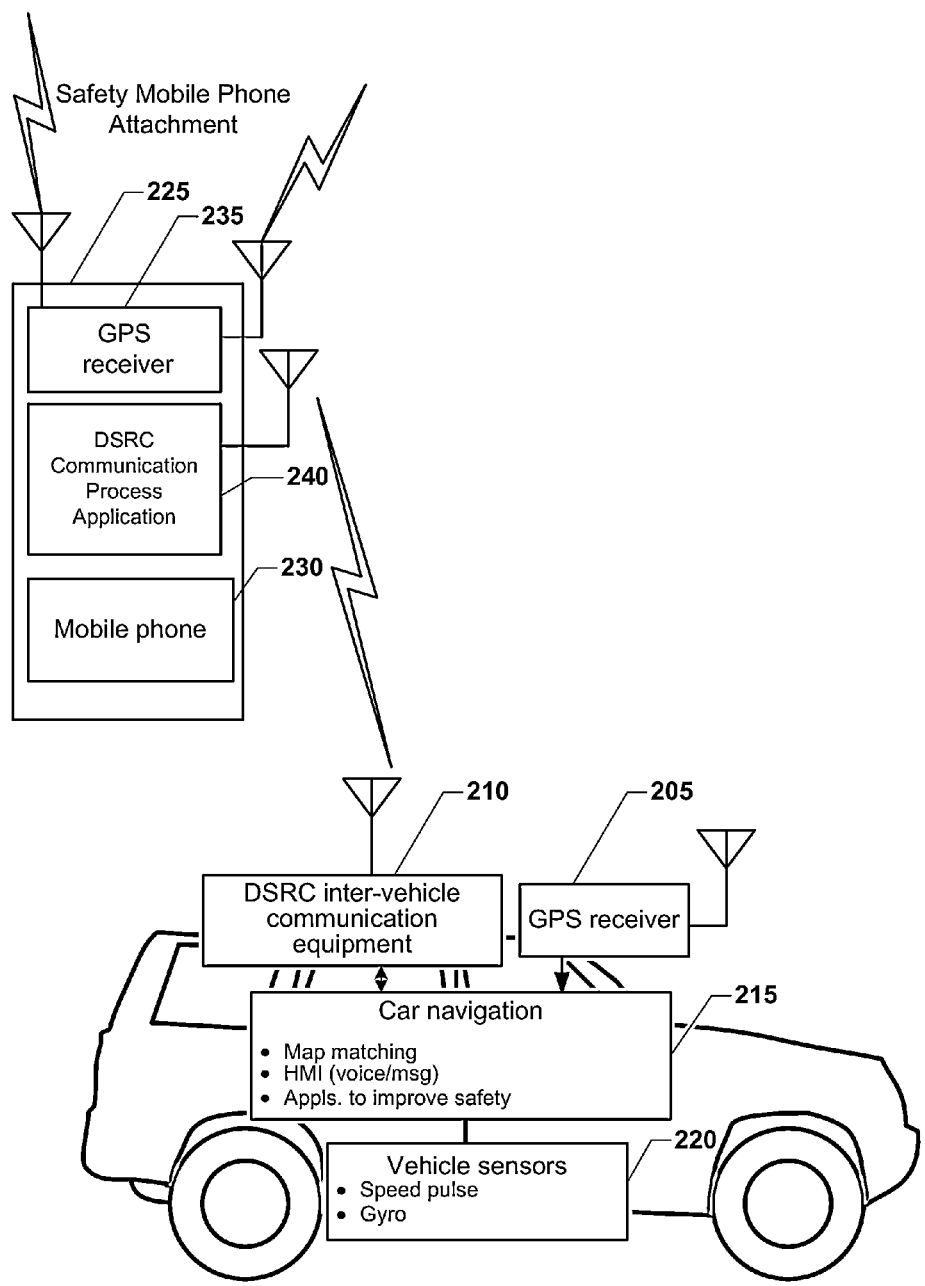
FIG. 2 is a communication system diagram illustrating functional components of an embodiment vehicle communication system.

Functional components that may be implemented in a vehicle and in a mobile device for use within an embodiment communication system are illustrated in FIG. 2. Vehicles 200 may include a GPS receiver 205, a DSCR inter-vehicle communication device 210 coupled to an antenna 213, a car navigation unit 215, and at least one vehicle sensor 220. These components may be integrated within a vehicle processing unit 200. An example of such a vehicle processing unit is further described below with reference to FIG. 10. The GPS receiver 205, the device 210 and the car navigation unit 215 may exchange information to support and exploit information received via the inter-vehicle communication system as described herein.

The DSRC inter-vehicle communication device 210 enables the transmission and reception of peer transmissions to and from among participating vehicles within the communication system 50. As discussed above, peer transmissions enable vehicles in the network 50 to wirelessly communicate directly with any other participating vehicle within the range determined by the wireless network protocol.

In addition to vehicle processing units 200, the inter-vehicle communication system may support or enable communications with other mobile communication devices, including hand held units such as appropriately configured mobile telephones 225. Such mobile phones may include conventional communication modules 230 and a DSRC communication processor 240 to enable sending and receiving peer transmissions within the communication system 50. The mobile communication device 230 includes one or more antennas operatively connected to the DSCR communication module 230, a GPS receiver 235, as well as other wireless modems which the mobile device may include.

The DSRC inter-vehicle communication device 210 can receive data from many sources including a central base station 10, other vehicles 22, 24, 26, local base stations 16, 18 and 20, and/or roadside units shown in FIG. 1. The peer transmissions may comprise data according to several formats, such as the IEEE 1609 Family of Standards for Wireless Access in Vehicular Environments (WAVE). Dedicated short-range communications (DSRC) at 5.8 GHz are one-way or two-way, short- to medium-range wireless communication channels specifically designed for automotive use. However, other data protocols may be used, and references to the DSRC are not intended to limit the scope of the claims to such communication protocols unless specifically recited.

A number of uses and applications are anticipated for inter-vehicle communication systems, including emergency warning systems for vehicles, cooperative Adaptive Cruise Control, cooperative Forward Collision Warnings, intersection collision avoidance, approaching emergency vehicle warning, vehicle safety inspection, transit or emergency vehicle signal priority, electronic parking payments, commercial vehicle clearance and safety inspections, in-vehicle signing, rollover warning, probe data collection, and highway-rail intersection warning.

Figure 3:
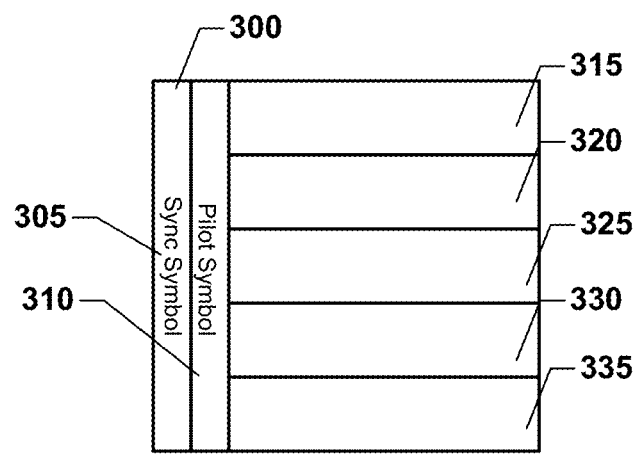
FIG. 3 is a diagram of a dedicated short-range communication transmission structure.

To enable communicating data sufficient to support the various applications for highway communication systems, the peer transmission messages may be formatted similar to that illustrated in FIG. 3. In particular, peer transmission messages 300 may include a number of synchronization symbols 305 and a number of pilot symbols 310. For example, the DSRC MAC protocol is based on half-duplex time division multiplex (TDMA) and includes a beacon signal and two different types of up-link windows for vehicle-to-vehicles messaging, or a public uplink window and a second private uplink window. A public uplink window may include a number of public time slots, which may be used by every vehicle to transmit messages within the communication zone. Together with a Beacon Service Table, which holds information about the valid application and protocol parameters at a specific beacon site (such as length of public and private windows), public windows may be offered periodically by the beacon to newly arriving vehicles (address acquisition or connection phase).

A private window allocation reserves a time period for one specific vehicle and therefore protects the window against data collisions after the address of a vehicle is known or during a transaction phase. To avoid unnecessary delays during the address acquisition phase, collision situations may be resolved. By randomly distributing the transmission of newly arriving vehicles over several public slots, the probability of data collisions is minimized.

FIG. 3 illustrates that the peer transmission messages 300 may include a header 315, a number of environmental property data 320-325 and payload data 330-335. The header data 315 may include a vehicle identification parameter and a priority identification parameter. The environmental property data 320-325 may include positioning and heading information. The payload data 330-335 may include message data. Preferably, at least one structure includes reliability information of the peer transmission so subsequent message participants can process the peer transmissions in an appropriate manner. At least one property data block includes a reliability indication of the message. For example, the block may include a code that indicates high reliability, low reliability, discard, urgent and reliable, or similar codes.

Messages may include a number of different types of information, each of which may have a different reliability indication. For example, information related to location may have a measurement inaccuracy based upon the method by which the location was determined. For example, location based upon a GPS measurement will have a certain inaccuracy depending upon the number of satellites viewed the duration of satellite signal measurements used in determining the position. As another example, locations based upon an extrapolation from a known location, such as in the form of an estimated distance from a current location determined from a GPS measurement, may have much larger errors. Other types of information may have no uncertainty, such as the fact that an accident has been identified by a user at the particular location. The fact that the accident occurred has a very high reliability, essentially 100%, but the accuracy of the location of the accident may have an error basket of tens to hundreds of feet. Thus, in the determined reliability indication assigned to messages may include a number of reliability indications which may all be different one from another. Similarly, the reliability of different types of information within a given message may change over time in a different manner. For example, the location of an accident may not vary significantly, because the location is fixed. However, the accident itself may be cleared up and thus, no longer a factor for reporting to other vehicles. Thus, over time, the reliability of the location information may not change while the reliability of an accident indication may degrade over time commensurate with the opportunity of rescue personnel to remove the accident from the scene.

Figure 4A:
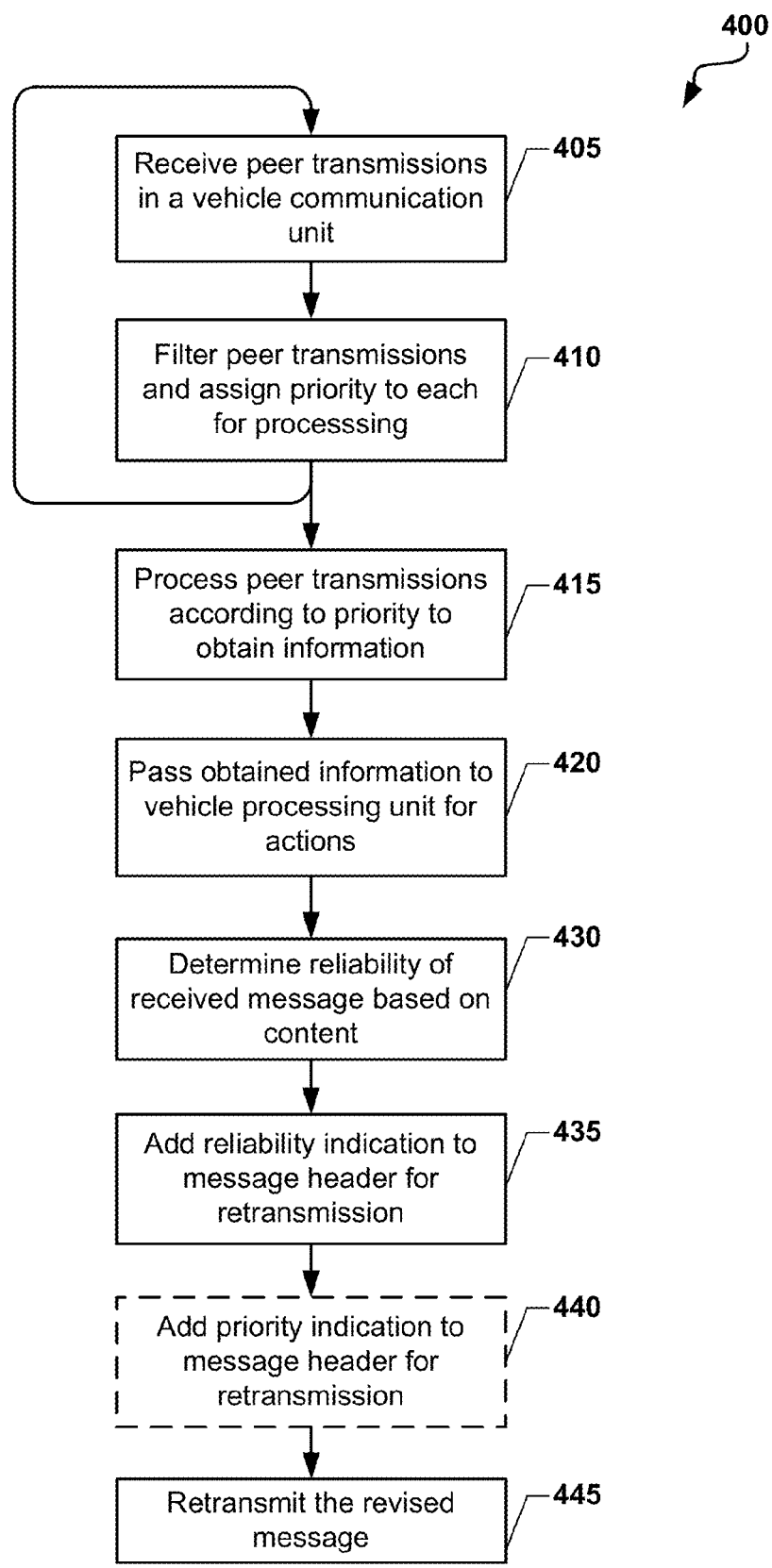
FIGS. 4A and 4B are process flow diagrams of embodiment methods for prioritizing, processing, and retransmitting peer transmissions.

FIG. 4A illustrates an embodiment method 400 for receiving and prioritizing peer transmissions, determining whether the peer transmission is reliable and indicating a reliability of the message in retransmissions for use by subsequent recipients. In method 400, the processor may receive a peer transmission in a vehicle communication unit in block 405. In block 410, the processor may filter the peer transmissions and assign priorities to each received message for processing. The peer transmissions may be filtered based on a variety of predetermined criteria. Further descriptions of the processes of message filtering and assigning priorities to messages accomplished in block 410 are provided below with reference to FIG. 5. Messages that have been filtered and prioritized may be sorted into a number of queues for further action. The queues may include, for example, a queue for messages that may be immediately processed, a queue for messages that may be discarded, a queue for messages that may be held for processing later (e.g., 1-2 seconds later), or a queue for messages that may be further filtered, etc.

In block 415, the inter-vehicle communication device processor may process the received peer messages according to the priority assigned in block 410 in order to obtain the information received in each message. This processing may include unpacking of the message, executing error correction decoding, locating relevant data within the message payload, and other well-known message interpretation operations. In block 420, the obtained information may be passed to the vehicle processing unit for action. This may involve placing the received obtained information in a queue or cache for processing, adding the information to a data table, or storing the information in a memory location which the processing unit is configured to access as part of the overall vehicle system. In block 430, the processor may evaluate various characteristics and information contents of the processed message in order to assess its reliability. As discussed in further detail below with reference to FIG. 6, this assessment of message reliability may involve comparing information contained within the message to information regarding the message known to the processing unit. In block 435, the processor may add an indication of the determined message reliability to a message header that will be included when the message is retransmitted. This indication may be a simple code or a value included in the header which other receiver devices can use in order to assist in prioritizing messages for processing. By adding the reliability indication to the message header prior to re-transmission, the embodiment method enables each vehicle to assist other vehicles in prioritizing messages based upon information known to the transmitting vehicle's processor. Optionally, the processor may also add a priority indication to the message header prior to re-transmission reflecting the priority that the processor assigned to the message in block 410. Adding this optional information to the message header enables each vehicle to assist other vehicles in prioritizing messages. In block 445, the message may be retransmitted as revised to reflect the reliability indication, and optionally a priority indication.

As indicated in FIG. 4A, the process of receiving and filtering peer transmissions in block 405 and 410 occurs continuously, passing received messages into a prioritized queue or multiple queues from which messages are accessed and processed in blocks 415 through 445.

Figure 4B:
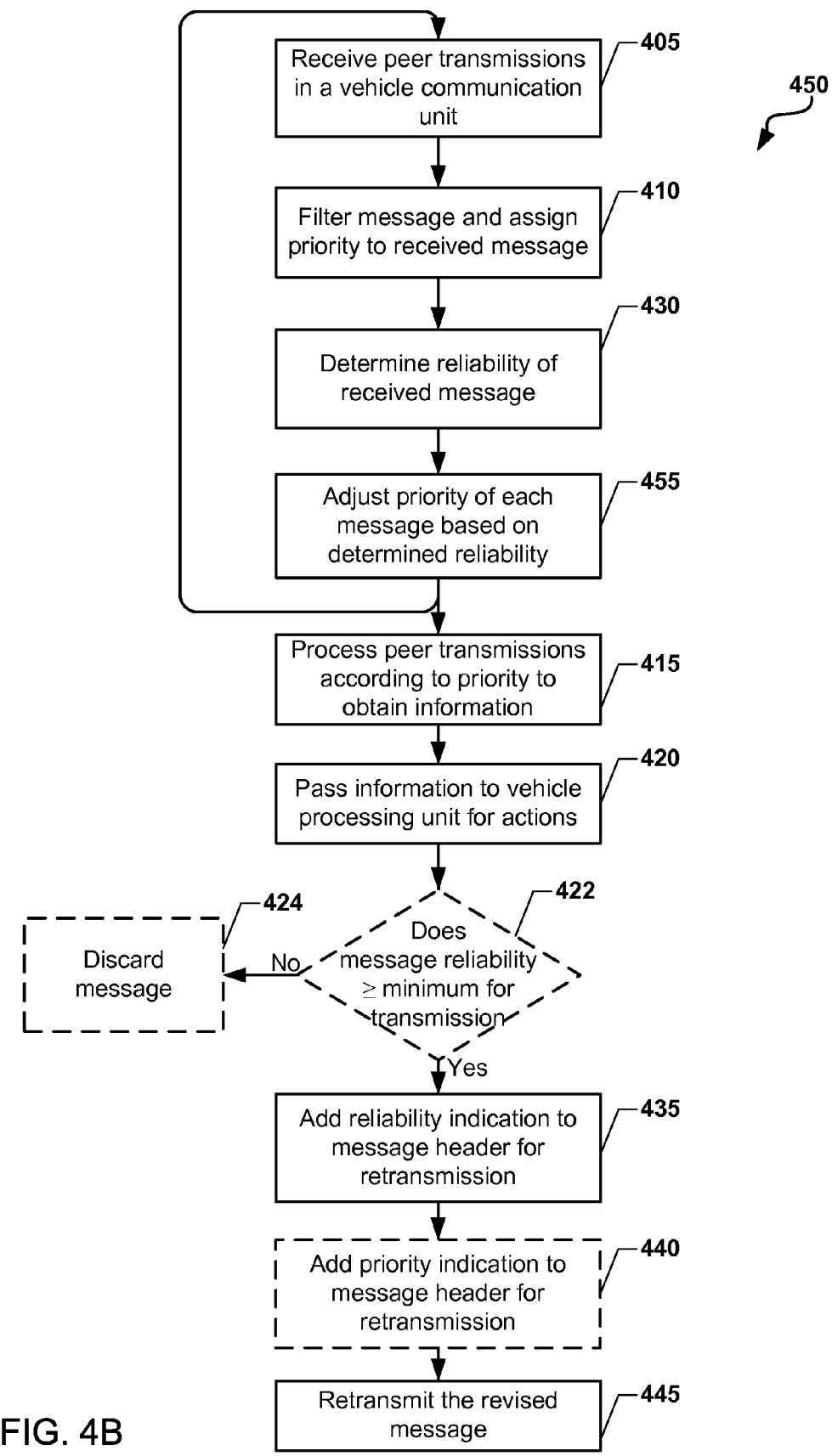

In an alternative embodiment method 450 illustrated in FIG. 4B, the inter-vehicle communication device processor may perform operations of determining reliability of received messages in block 430 as part of or just after messages are assigned a priority in block 410. This prioritizing of messages before the message content is analyzed may utilize information available in the receiver circuitry regarding the received transmission, such as signal strength and Doppler shift, as well as information that may be included within the message header (and thus accessible without processing of the entire message). Determining a reliability of each received message before the message is processed may enable the processor to better assign priorities to each message by considering reliability in the prioritization algorithm. In this manner, messages that might otherwise be assigned a high priority but are determined to have low reliability may be assigned a lower priority for processing. Thus, in block 455, the processor may utilize the reliability for each received message determined in block 430 to adjust the priority assigned to each message in block 455. In block 415, the vehicle processor unit may then process peer transmission according to priority in order to obtain the information contained within the messages, and in block 420, the obtained information may be passed to the appropriate vehicle application or processor for action.

In an optional embodiment, the vehicle processing unit may determine whether the message should be transmitted at all based upon the reliability of the message. It may not make sense to transmit messages that the processing unit determines have a reliability score that is less than some predetermined threshold. So in optional determination block 422, the vehicle processing unit may determine whether the determined reliability of information in the message equals or exceeds a minimum threshold for which send the message is warranted. Messages whose information is not sufficiently reliable may not be transmitted. Thus, if the message reliability is less than the minimum threshold (i.e., determination step 422="No"), the message may simply be discarded in block 424.

Thereafter, prioritized messages may be revised for retransmission to add the reliability indication, and retransmitted as described above with respect to block 435 through 445.

Figure 4C:
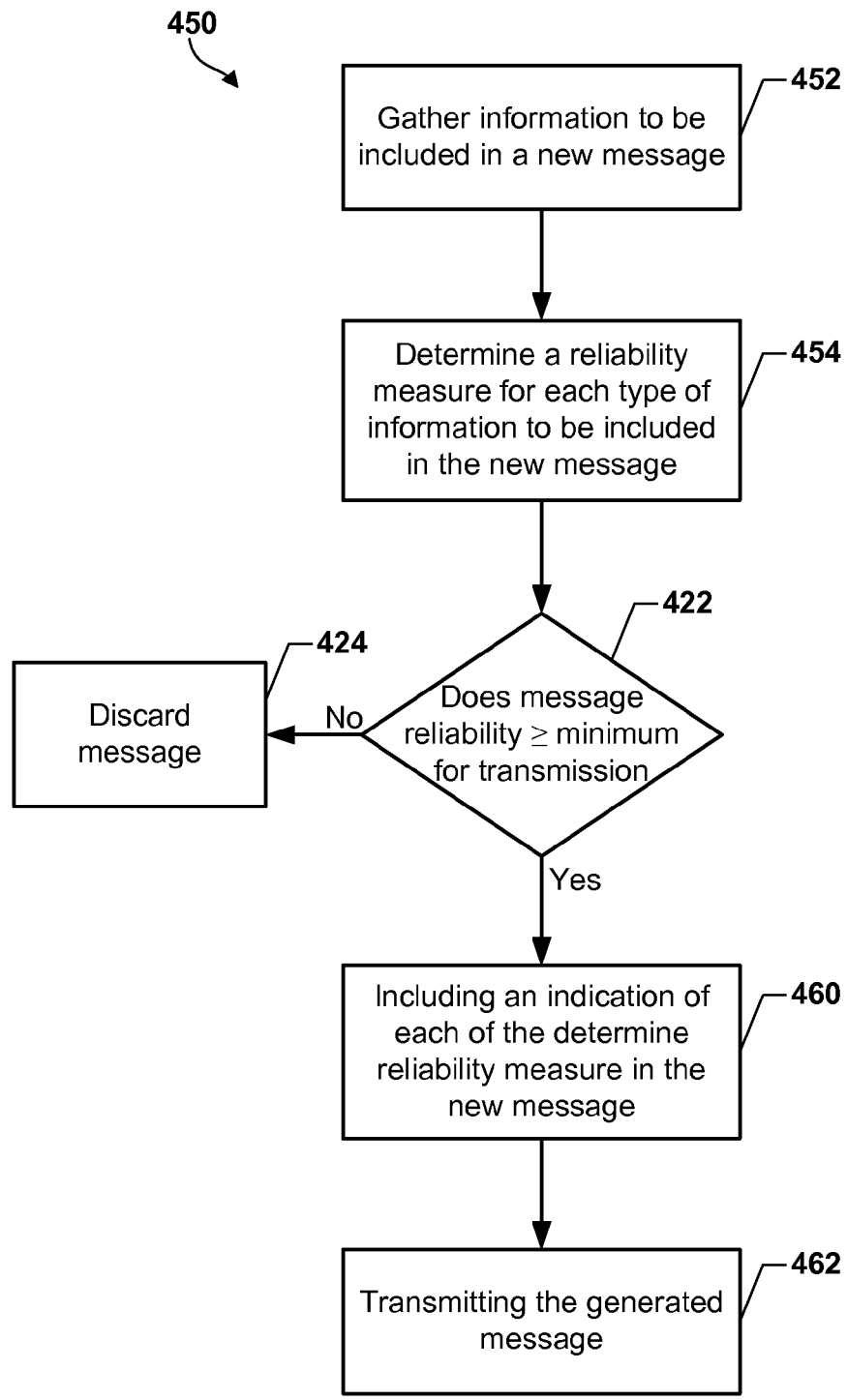
FIG. 4C is a process flow diagram of an embodiment method for determining a reliability of an originally generated message.

Vehicle processing units may also calculate reliability indications, as well as priorities for messages at the time they are initially generated. FIG. 4 C illustrates an embodiment method 450 that may be implemented by a vehicle processing unit to assign priority and reliability indications when messages are generated. In method 450 in block 452, the vehicle processing unit may gather the information that is to be included in a new message. This information may include the time the message was generated, vehicle location, traffic conditions, vehicle speed, and similar vehicle environmental conditions that may be relevant to the type of message being generated. This information may also include user inputs, such as information received from a user interface, such as a touchscreen or button press indicating that an accident has occurred or that assistance is required, to name just two examples. In block 454, the vehicle processing unit may determine a reliability measure for each type of information to be included in the new message. As noted above, each type of information within the message may involve different reliability and/or error characteristics. For example, information related to location may include the error or reliability measure associated with the method used to obtain the vehicle location. In block 454 each of these reliability/error measures are assembled. In determination block 422, the vehicle processor unit may determine whether the determined reliability of information in the message equals or exceeds a minimum threshold for which send the message is warranted. As mentioned above, messages whose information is not sufficiently reliable may not be transmitted. Thus, if the message reliability is less than the minimum threshold (i.e., determination step 422="No"), the message may simply be discarded in block 424.

If the message reliability meets the minimum threshold (i.e., determination step 422="Yes"), the vehicle processing unit may include an indication of each of the determined reliability measures in the new message in block 460. Also, the processing unit may add a priority indication to the message in block 460 based upon information known to the processing unit. For example, if the message originated from a user indicating that an accident has happened, the processing unit may assign a high priority value to the message in block 460. Finally, the generated message may be transmitted by the vehicle's transmitter unit in block 462.

As mentioned above, a variety of message filtering techniques may be used by the processor in order to prioritize or sequence received messages for processing. The data used in the prioritizing algorithms may be obtained from the message header or similar message preamble symbols, as well as from the receiver circuitry that received the message, such as signal strength and Doppler shift. As an example of filtering based upon information within the message header or preamble, peer transmissions may be filtered based on an indicated content or importance of the peer transmission. For example, some peer transmissions may include a header code indicating that they involve safety information, in which case such messages may be accorded a high priority so they may be processed immediately. As an example of filtering based upon information obtained from the receiver circuitry, peer transmissions may be filtered based upon their signal strength, which may be determined by the receiver's automatic gain control (AGC) circuit. For example, messages whose received signal strength is below a predetermined threshold may be assigned a low priority since whatever information they contain is unlikely to be of immediate concern to the vehicle. As another example, received transmissions with a Doppler shift indicating that the transmitter is moving away from the vehicle may be assigned a lower priority than messages whose Doppler shift indicates the vehicle is approaching the vehicle. The logic for this prioritization is that messages from sources coming towards the vehicle are more likely to be of immediate relevance than messages from sources moving away.

In an embodiment, the processor may filter peer transmissions based on the Doppler shift of the transmissions, as well as information regarding the distance and elevation of the transmitter. Distance information may be inferred from the signal strength, or from coordinate information which may be positioned within the message header in order to enable prompt access by the receiver. Instead of position information, prioritizing may be accomplished based upon a direction to the transmitter, such as may be determined using known trigonometric methods by processing signals received from two or more vehicle antennas. Elevation information may be contained within the message header or may be estimated by processing signals received from two or more antennas positioned at different elevations on the vehicle. Filtering based on Doppler shift, distance, direction, and elevation may enable the processor to quickly identify transmitters which may be moving on a collision course with respect to the vehicle. For example, a positive Doppler shift combined with a constant bearing to the transmitter would indicate a potential collision is imminent. However, if the processor determines that the transmitter is at a different elevation than the vehicle, this may indicate that the transmitter is proceeding on an overpass, and thus a collision is unlikely.

Figure 5:
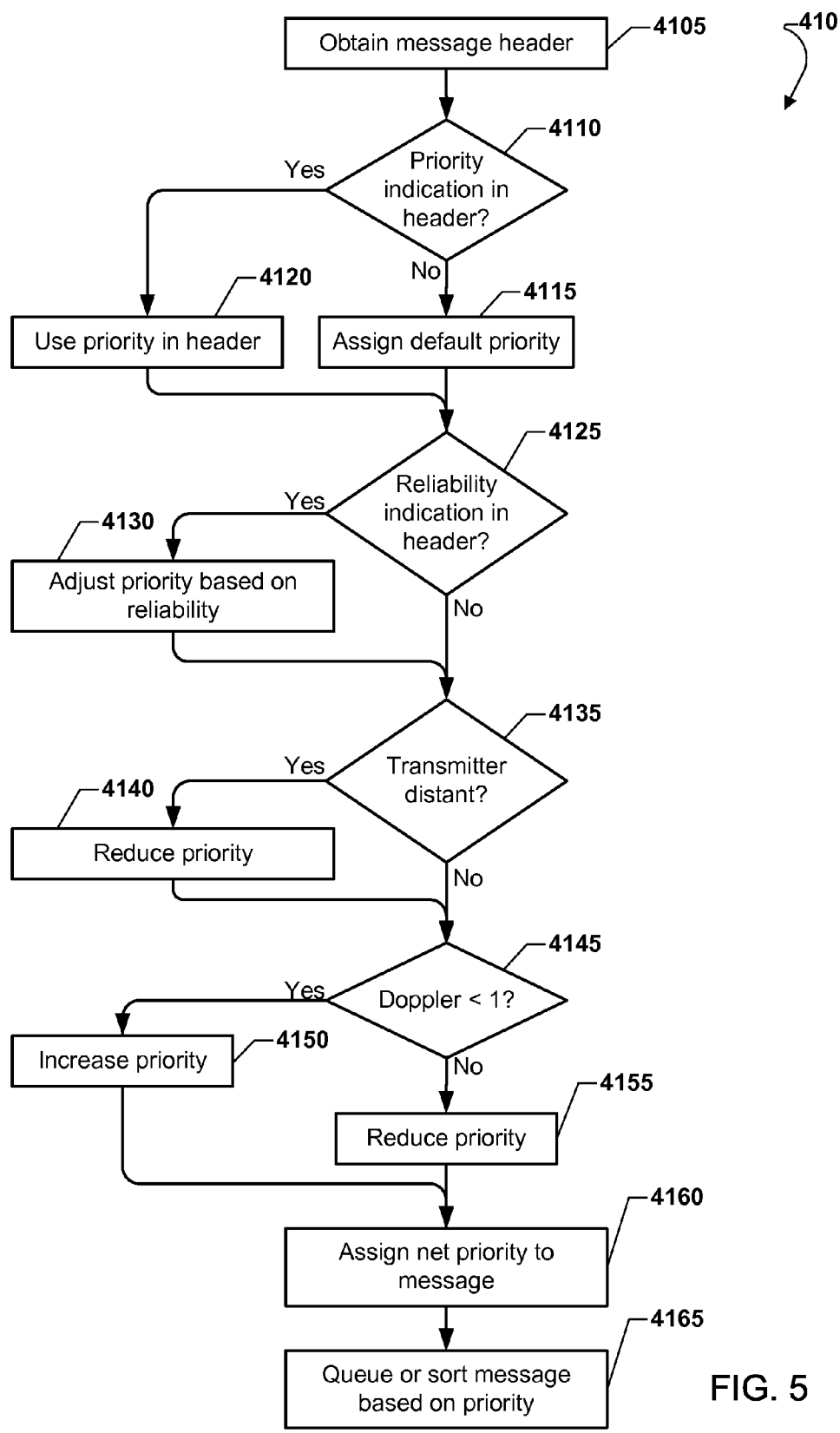
FIG. 5 is a process flow diagram of an embodiment method for prioritizing received peer transmissions.

FIG. 5 illustrates an example of operations that may be accomplished as part of block 410 for filtering and prioritizing messages within received peer transmissions. The operations illustrated in FIG. 5 are just a sample of some of the types of prioritizing operations that may be performed. It is anticipated that further operations may be included as part of the prioritizing process.

Referring to FIG. 5, prioritizing of received peer transmission messages may begin in block 4105 with the processor obtaining the header portion or symbols of the received message. Typically, message headers can be obtained quickly because they occur at the front end of the transmission, and may not include encryption or significant error correction encoding. Thus, the message header can be properly obtained in block 4105 for use in prioritizing the received message in blocks 410 and 415 described above with reference to FIG. 4A. In determination block 4110, the processor may determine whether the header information includes an indication of the message's priority. Such a priority indication may be included by the transmitter, such as to indicate whether the message is urgent, routine, or low priority. If the received message header does include a priority indication (i.e., determination block 4110="Yes"), the processor may use the priority indication or code from the header to set an initial prioritization for the message in block 4120. If the header does not include a priority indication (i.e., determination block 4110="No"), the processor may assign a default priority (e.g., high priority) to the message in block 4115.

In determination block 4125, the processor may determine whether the message header includes an indication of the message's reliability. This may be a code or symbol included within the header symbols by the transmitter of the message. If the processor determines that the message header does include a reliability indication (i.e., determination block 4125="Yes"), the processor may adjust the priority assigned to the message based upon the reliability indication in block 4130. For example, if the message reliability indication communicates that the message is unreliable, the processor may decrease the priority assigned to the message in block 4130. On the other hand, if the message reliability indication communicates that the message is highly reliable, the processor may increase the priority assigned to the message in block 4130, since the processor can rely on whatever information is contained in the message. If the message header does not contain a reliability indication (i.e., determination block 4125="No"), the processor may make no adjustments to the priority assigned to the message. Other adjustments to the message priority based upon information obtained from the message header may be implemented in a similar manner. For example, the processor may assign a higher priority to messages including a transmitter identifier in the message header indicating the messages were transmitted by a trusted authority, such as police, fire, rescue or a roadside unit operated by a highway authority.

With the message priority adjustments accomplished based on the message header information, the processor may consider information regarding the message obtained from the receiver circuitry. In determination block 4135, the processor may obtain signal strength or automatic gain control (AGC) information from the receiver circuitry in order to make decisions regarding the priority assigned to the message based on the distance to the transmitter. Signal strength is a type of information that is available to the processor without having to decode the message contents, and thus available for promptly assigning a priority to the message. FIG. 5 illustrates an implementation in which determination block 4135 compares the signal strength to a single threshold value in order to determine whether the transmitter is located beyond a threshold distance. However, the determinations made in block 4135 may compare the signal strength to a number of thresholds in order to characterize the distance to the transmitter in terms of the plurality of classifications, such as far away, moderately close, close, and very close. Such multiple classifications enable the processor to rank the priority based upon the relative proximity of the transmitter. Such prioritization may be useful since whatever information is being provided by distant transmitters is likely to be less urgent and/or less relevant to the vehicle than information provided by transmitters very close to the vehicle which may present a threat of collision. Thus, in the example illustrated in FIG. 5, if the processor determines that the transmitter of the received message is located at a long distance from the vehicle (i.e., determination block 4135="Yes"), the processor may reduce the priority assigned to the message in block 4140. In implementations which determine whether transmitters are very close to the vehicle, the priority assigned to the message may be increased (not shown).

In determination block 4145, the processor may determine whether a Doppler shift of the received message is positive (indicating that the distance between the transmitter and the vehicle is decreasing) or negative (indicating that the distance between the transmitter and the vehicle is increasing). If the processor determines that the Doppler shift is positive, indicating that the transmitter and the vehicle may be approaching each other (i.e., determination block 4145="Yes"), the processor may increase the priority assigned to the message in block 4150. On the other hand, if the processor determines that the Doppler shift of the received transmission is less than one, indicating that the transmitter and the vehicle are moving away from each other (i.e., determination block 4145="No"), the processor may decrease the priority assigned to the message in block 4155. Other adjustments to the message priority based upon information obtained from the receiver circuitry regarding the received peer transmission may be implemented in a similar manner.

In an embodiment, peer transmissions may include transmitter location information sufficient to locate the transmitting vehicle within particular lanes of traffic, along with direction of movement information. Such information may be useful for prioritizing messages since a transmitter located in adjoining lanes (for example on the other side of a divided expressway) may present a greater risk of collision to the vehicle. Traffic approaching the vehicle from the opposite direction but on the other side of a cleanly divided highway may present a low risk of collision. Thus, messages from transmitters on the other side of a divided highway may be given lower priority than messages from transmitters on the same side of the highway. To facilitate this prioritization of messages based upon lane position information, the processor may access a digital map which may be stored in memory to determine whether the transmitter is in a lane position that could present a risk of collision.

At the conclusion of all filtering and prioritizing operations, the processor may assign the net priority to the message in block 4160, and use that priority to sort or queue the message for processing in block 4165. As mentioned above, the sorting of messages may include storing each message into an appropriate queue for processing so that higher priority messages are processed before lower priority messages. For example, messages assigned a high priority value may be stored in a high priority queue for immediate processing, while messages assigned a non-urgent priority may be stored in a medium priority queue for processing when the high priority queue is empty, and low priority messages may be stored in a third queue for messages that will be processed only after the high and medium priority queues are empty. Low priority messages may be ignored altogether if the higher priority queues are never emptied before the message age exceeds a predetermined value.

It should be appreciated that the filtering and prioritizing of received messages may be accomplished in any order. Also, messages may be sorted or stored in queues throughout the filtering and prioritization process, so that messages initially assigned a high priority are cached in a high priority queue even while they are being filtered. This would enable messages to be immediately processed without waiting for prioritization if the processor has sufficient capacity, as may occur when the number of messages being received is relatively small. In this embodiment, messages may be initially cached in a high priority queue, and then be moved to lower priority queues consistent with adjusted priorities as the filtering process proceeds. In this manner, messages may remain available for processing based upon their current prioritization while the filtering and prioritization process continues.

As mentioned above, the processor may assign an indication of reliability to each message before it is retransmitted based upon a variety of considerations. Examples of considerations that may be used to assign reliability include signal strength as a proxy for transmission distance, actual distance to the transmitter, inconsistencies between the indicated location of the transmitter and the estimated distance to the transmitter (e.g., based on signal strength), age of the initial message, and identity of the transmitter (e.g., another vehicle versus a police, fire or rescue vehicle), an authentication criteria included within the message, and inconsistencies between the message content and information known to the vehicle processor. Other information that may be considered in assigning a reliability value include transmitter identity or security information, such as a MAC identifier or security identifier, a count of the number of times the message has been retransmitted, the bit error rate in the received transmission, information received from error correction processing of the message, etc. A transmitter identifier may be used to assign high reliability indications to messages that have been received from a trusted source, such as police cars, fire trucks, ambulances, and roadside units operated by a highway authority.

Figure 6:
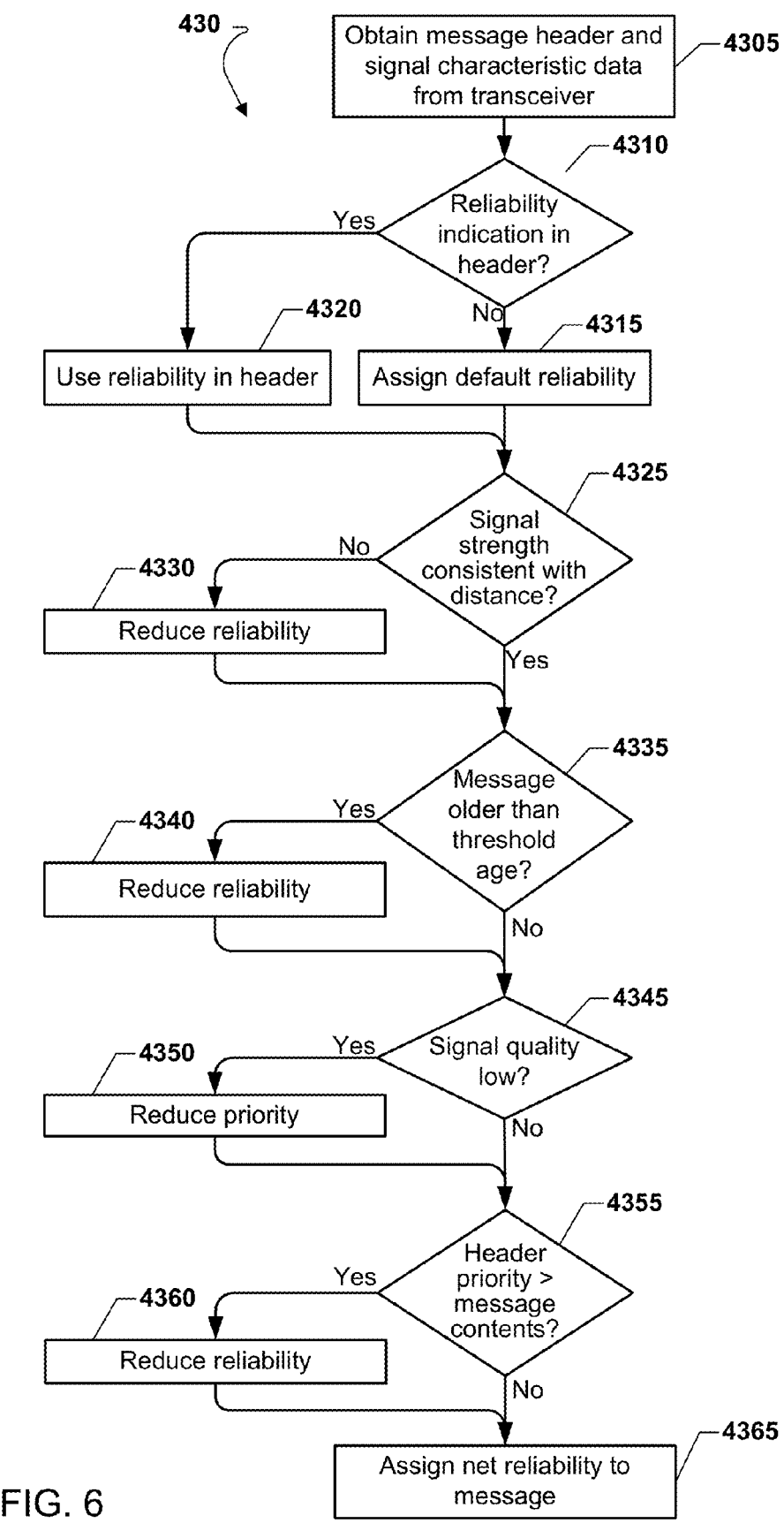
FIG. 6 is a process flow diagram of an embodiment method for determining a reliability value to be assigned to a received peer transmission.

FIG. 6 illustrates an example of operations that may be performed as part of block 430 (see description of FIG. 4A above) for assigning a reliability value to receive messages. The operations illustrated in FIG. 6 are meant to serve only as a few examples of the types of operations that may be used in determining message reliability in block 430, and other operations are expected to be implemented in practice. For example, the processor may obtain the message header and signal characteristic data in block 4305. This information may be the same header information obtained in block 4305 and signal information received from the receiver circuitry that was used to filter and prioritize the received message in determination block 4135 and 4145 described above with reference to FIG. 5. In determination block 4310, the processor may determine whether the message header includes a reliability indication, such as may have been provided by a transmitter as part of retransmitting the received message. If the message header includes a reliability indication (i.e., determination block 4310="Yes"), the processor may use that reliability indication as an initial reliability value. If the message header does not include a reliability indication (i.e., determination block 4310="No"), the processor may assign a default reliability to the message. In determination block 4325, the processor may determine whether the signal strength information is consistent with distance between the transmitter and the vehicle that is calculated from information contained within the message itself. If the signal strength is inconsistent with the calculated distance, this indicates that the transmitter may not be at its reported location, in which case the message may be considered unreliable. This situation could arise if the transmitter has an unreliable measure of its location or an untrustworthy transmitter is sending out misleading messages. If the processor determines that the signal strength is inconsistent with the calculated distance (i.e., determination block 4325="No"), the processor may reduce the reliability value assigned to the message in block 4330.

Since the reliability of information contained within the message may diminish with time, in determination block 4335 the processor may compare an age of the message to a threshold value to determine whether the information is stale. The age of the message may be calculated by comparing a message creation timestamp value to the current time. The predetermined age threshold may be set as part of the system configuration to reflect how rapidly the system designer believes that the messages will become unreliable. The threshold value for determining when messages are less reliable due to their age may depend upon the transmitter and the information contained within the message. For example, location information of a traveling vehicle will quickly become unreliable due to the movement of the vehicle, so the threshold for such messages may be set at 10 seconds or less, for example. On the other hand, traffic condition reports will become unreliable at a much slower rate, such that traffic reports may remain reliable for up to 5 minutes. Other types of information may remain reliable for a much longer period of time, such as road construction announcements, weather forecasts, and system reference information (e.g., system administrator telephone numbers, system operating frequencies, system authority identifiers, etc.). If the processor determines that the message age is older than a threshold value (i.e., determination block 4335="Yes"), the processor may reduce the reliability value assigned to the message in block 4340.

The reliability of the peer transmission messages may also be affected by interference and difficulties in accurately receiving the transmitted messages. Therefore, the processor may determine whether measured signal quality is below some predefined threshold value in determination block 4345. For example, the signal quality may be determined based upon a bit error rate calculated by the receiver circuitry or a number of errors corrected or uncorrected in the error correction processing of the received message. If the processor determines that the signal quality is less than the threshold value (i.e., determination block 4345="Yes"), the processor may reduce the priority assigned to that message in block 4350.

Reliability of messages may also be based upon an assessment of the accuracy of information contained in the message. Thus, if the processor determines that some information in the message is not correct, the entire message may be assigned a low reliability value. For example, if the message header includes an indication of the importance of the message, but the processor determines the content of the message is inconsistent with the indicated priority, the message may be deemed to be unreliable. An example of such a situation would be a received message with a header code indicating the message has high priority but the content of the message is routine or not urgent. Thus, the processor may determine whether the header priority indication exceeds a reasonable priority of the message content in determination block 4355. If so (i.e., determination block 4355="Yes"), the processor may further reduce the reliability value assigned to the message in block 4360. Other adjustments to the message reliability value may be based upon information obtained the message itself and from the receiver circuitry and implemented in a similar manner. Once all the reliability considerations have been addressed by the processor, the net reliability value may be assigned to the message by the processor in block 4365.

As mentioned above, vehicle processing units could become deluged by wireless transmissions from other vehicles, such as when the processing units are WAVE/DSRC devices communicating using the 802.11p protocol. This situation could result in information overload of onboard units (OBU). The processing capability of the OBU may be limited as well, so that it may be unable to process all the information that it receives.

To address this situation, in a further embodiment, the road side unit transmitters and vehicle onboard unit transmitters may include mechanisms for working together to control the number of nodes that retransmit given messages. This may include mechanisms to prevent message flooding by limiting the number of vehicles that retransmit particular messages so that not all vehicle communication nodes retransmit every message. In a vehicular wireless network such as a DSRC/Wave-based network, each vehicle has an OBU that can communicate with a Road Side Unit (RSU) or other OBUs. When the traffic increases, the number of OBUs communicating with the RSUs increases. This can increase the interference due to increased collisions in the network making it harder for transmitted messages to be received. Some proposed vehicle communication systems use CSMA/CA, such as in typical 802.11 networks, which may be insufficient to balance the interference/collision-rate in the system.

This embodiment enables RSUs to exert a degree of control over the number of OBUs communicating with it and with each other in a given time window. As the number of OBUs registered with an RSU increases, the RSU may assign a random number p between 0 and 1 to each OBU that each OBU may use to decide whether to transmit certain types of messages. This number p may be reduced as the number of nearby OBUs increases. The reduction of p as a function of the number of OBUs may be linear, logarithmic, exponential, or any non-linear form. Prior to attempting transmission of a message, an OBU may generate a random number. If that random number is less than p, for example, then the OBU may attempt to transmit a message in a time window T using traditional CSMA/CA schemes. If that random number is greater than p, then the OBU may avoid transmissions in the time window T. In this embodiment, no clock synchronization between an OBU and an RSU is necessary to determine the boundaries of each time window T. The time window may be based just on an internal clock in the RSU. Prior to the next time window, the OBU may generate another random number to make the same determination regarding whether to transmit the message (or another message) in the next transmission window. For general messages relating to the nature of the traffic in the network, such scaling of message traffic using a random number for scheduling can be used. For messages that an OBU must send to an RSU, such as initial registration or an important update, this random number-based scheduling may be skipped, and the traditional CSMA/CA-based scheme may be used in the network. This embodiment allows the RSU to be aware of and manage the volume of the traffic and the available spectral efficiency through a very simple mechanism that involves minimal synchronization and coordination among the various communication units.

Figure 7:
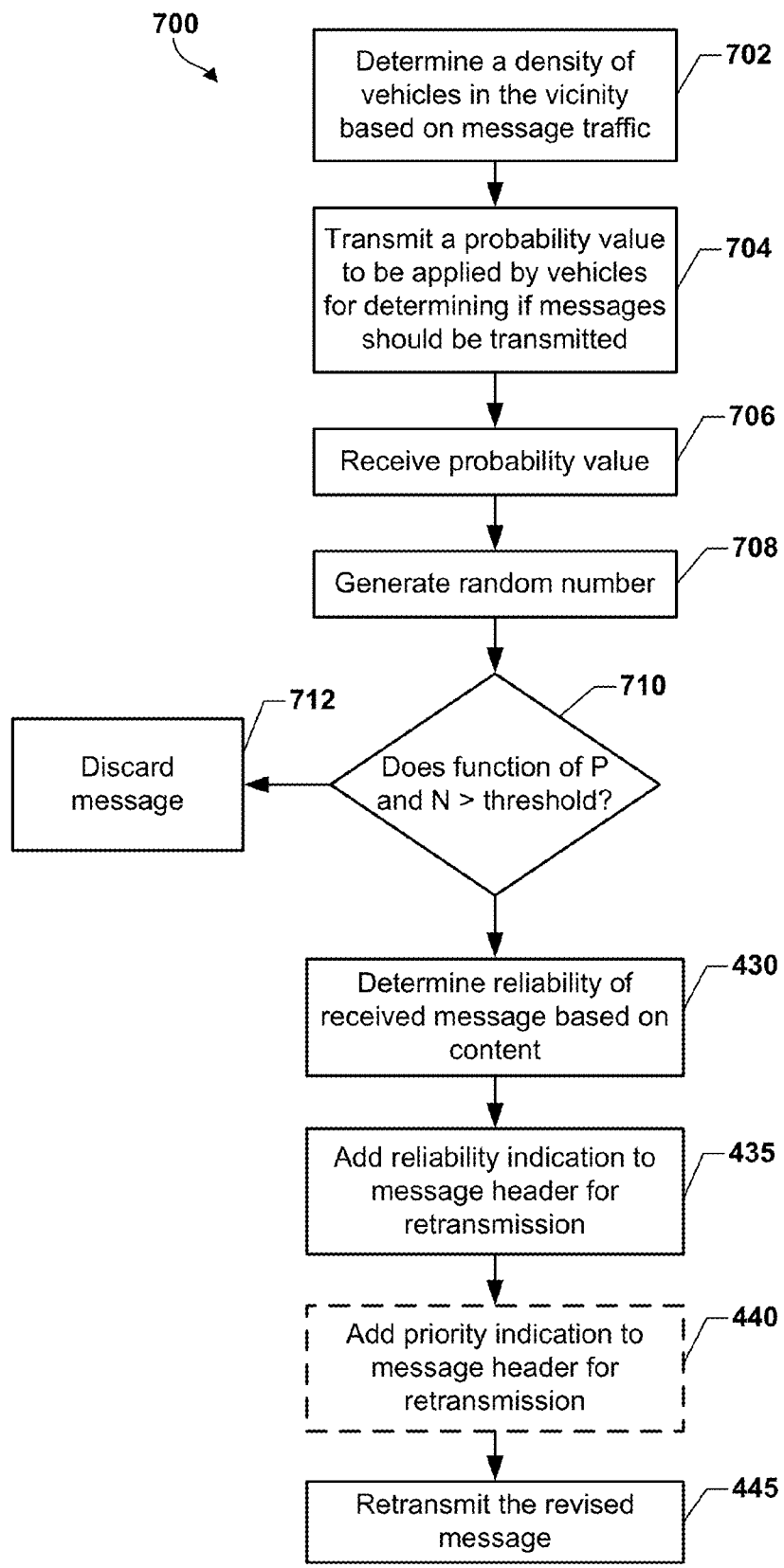
FIG. 7 is a process flow diagram of an embodiment method for controlling retransmissions of messages based upon signals received from roadside units.

FIG. 7 illustrates an embodiment method 700 that may be implemented between RSUs and vehicle OBUs to manage the proliferation of retransmitted messages. In method 700 in block 702, a roadside unit, or server coupled to a number of roadside units, may determine the density of vehicles within the vicinity based on received message traffic and/or other sensors (e.g., roadbed sensors). Knowing how many vehicles are currently present in the area, the roadside unit (or a server coupled to multiple roadside units) may determine a fraction or probability value that all vehicle processing units should use in determining whether a given message is to be retransmitted. By transmitting a probability value less than one, roadside units can ensure that not every vehicle retransmit every received message. The smaller the probability value provided by roadside units, the smaller the fraction of received messages that will be retransmitted by any given vehicle. The determined probability value may be transmitted from roadside units for reception by nearby vehicle processing units in block 706.

A variety of different mechanisms may be implemented within vehicle processing units to determine whether to retransmit messages based upon the received probability value. In an embodiment, processing units may use random numbers in combination with the received probability unit. In other embodiments, information known to the vehicle may be used in combination with the received probability unit to make the retransmission determination.

In an embodiment that makes use of a random number, that number may be generated in block 708 using a standard random number generator. This random number may be combined with the received probability value to make a decision in determination block 710 regarding whether a given message is to be retransmitted. Using a generated random number protects against bias or systematic errors that might result if vehicles were assigned messages to retransmit or otherwise directly controlled by roadside units. The generated random number may be used to determine whether any given message is retransmitted or whether the vehicle itself will be retransmitting received messages. Thus, in an embodiment, a new random number may be generated in block 708 for each received message to determine whether that message will be retransmitted.

The decision regarding whether to retransmit a received message may be made in a variety of ways using the probability value and the random number. For example, in a simple method, a message may be selected for retransmission if the random number is greater than the probability value. In another example, the random number may be multiplied times the probability value, with this product being compared to a threshold value to make the determination. In a further example, the probability value may be added to the random number, with retransmission depending upon whether the sum is greater than or less than a predetermined threshold value. More sophisticated functions, such as hash functions involving additional information (e.g., vehicle and/or processor unit identification numbers) may also be applied in determination block 710 so as to avoid systematic errors and bias.

If retransmission decision criteria is not satisfy (i.e., determination block 710="No"), the message may simply be discarded in block 712 rather than retransmitted. Discarding the message in block 712 does not affect whether the message is acted upon by the receiving vehicle processing unit.

If a determination is made that the message should be retransmitted (i.e., determination block 710="Yes"), the vehicle processing unit may proceed as described above with reference to FIG. 4. This may include: determining a reliability of the received message based on its content in block 430; adding the reliability indication to the message header for retransmission in block 435; optionally adding a priority indication to the message header for retransmission in block 440; and retransmitting the received message in block 445.

In another embodiment, rather than adding priority and reliability information into messages in the form of values or flag bits, this information may be reflected in the manner in which the messages are encoded within the time and frequency quadrants of Orthogonal Frequency Division Multiplex Access (OFDMA) wave forms of the airlink. In this embodiment, prioritization and reliability indications may be reflected in the messages by encoding high priority and high reliability time-frequency units or bins. In this manner, certain OFDMA sub-carriers and transmission times within transmission time-frames may be allocated to carrying messages of high priority, high reliability, or both. Since this mechanism of encoding high priority messages will be implemented system wide, vehicle processing units and receivers will know the particular sub-carriers and frame times to access first in order to obtain the high priority/high reliability messages for immediate processing. In this manner, high priority messages may be processed by the vehicle receiver circuitry immediately beginning with message reception.

Figure 8:
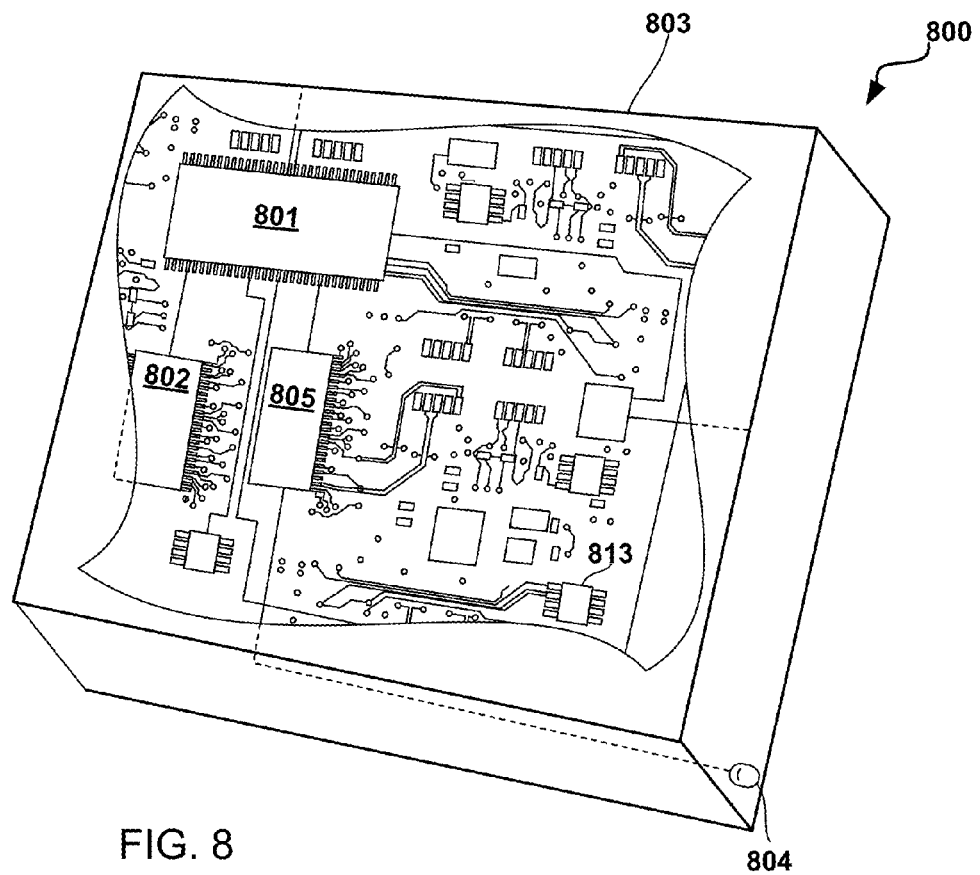
FIG. 8 is a component block diagram of a vehicle processing unit suitable for use in an embodiment.

FIG. 8 is a system block diagram of a vehicle processing unit 800 suitable for use with any of the embodiments. The embodiments may be implemented in a form suitable for installation within a vehicle, such as part of the vehicle's electronics or as a separate unit contained within a box 803 configured to be attached to a portion of the vehicle structure. A vehicle processing unit 800 may include a processor 801 coupled to memory 802 and to a radio frequency (RF) data modem 805. The RF modem 805 may be coupled to an antenna or an antenna connector 804 for receiving and transmitting radio frequency signals, such as DSRC protocol signals. The vehicle processing unit processor 801 may be any programmable microprocessor, microcomputer or multiple processor chip or chips that can be configured by software instructions (applications) to perform a variety of functions, including the functions of the various embodiments described herein. In some implementations, multiple processors 801 may be used, such as one processor dedicated to wireless communication functions and one processor dedicated to running other applications, such as vehicle safety functions, message interpretation and generation, etc.

Typically, software applications may be stored in the internal memory 802 before they may be accessed and loaded into the processor 801. The internal memory 802 may be a volatile or nonvolatile memory, such as flash memory, or a mixture of both. For the purposes of this description, a general reference to memory refers to all memory accessible by the processor 801, including internal memory 802, removable memory, and memory within the processor 801.

Figure 9:
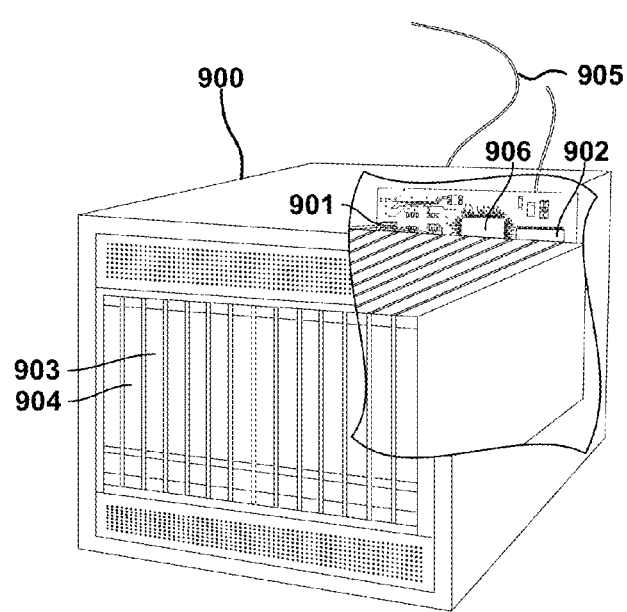
FIG. 9 is a component block diagram of a server device suitable for use in an embodiment.

While the various aspects are described above from the perspective of a vehicle processing unit, similar operations may be accomplished in fixed communication units, such as roadside units and central control servers. For example, the priority and reliability of messages may be determined by roadside units that receive messages from vehicles and retransmit the messages for reception by other vehicles. Roadside units which may be coordinated by a central or regional server may enable messages generated by one vehicle to be retransmitted from a plurality of roadside transmitters to all vehicles along a stretch of highway without waiting for the message to be relayed from one vehicle to the next. Such aspects may be implemented on any of a variety of commercially available computing devices or servers, such as the server 900 illustrated in FIG. 9. Such computing devices or servers 900 typically include a processor 901 coupled to volatile memory 902 and a large capacity nonvolatile memory, such as a disk drive 903. The server 900 may also include a floppy disc drive, compact disc (CD) or DVD disc drive 906 coupled to the processor 901. The server 900 may also include network access ports 904 coupled to the processor 901 for connecting to transmission facilities and for establishing data connections with a network 905, such as a local area network and/or the Internet. The processor 901 may be any programmable microprocessor, microcomputer, or multiple processor chip or chips that can be configured by software instructions (applications) to perform a variety of functions, including the functions of the various aspects described above. Typically, software applications may be stored in the internal memory 802, 902, and 903 before they are accessed and loaded into the processor 801, 901.

The processor 801, 901 may include internal memory sufficient to store the application software instructions. In many devices, the internal memory may be a volatile or nonvolatile memory, such as flash memory, or a mixture of both. For the purposes of this description, a general reference to memory refers to memory accessible by the processor 801, 901 including internal memory or removable memory plugged into the device and memory within the processor 801, 901 itself.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Computer program code or "program code" for execution on a programmable processor for carrying out operations of the various aspects may be written in a high level programming language such as C, C++, JAVA@, Smalltalk, JavaScript, J++, Visual Basic, TSQL, Perl, or in various other programming languages. Programs for some target processor architecture may also be written directly in the native assembler language. A native assembler program uses instruction mnemonic representations of machine level binary instructions. Program code or programs stored on a computer readable storage medium as used herein refers to machine language code such as object code whose format is understandable by a processor.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable storage medium. The steps of a method or algorithm disclosed herein may be embodied in a processor-executable software module executed which may reside on a tangible or non-transitory computer-readable storage medium. Non-transitory computer-readable storage media may be any available storage media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above also can be included within the scope of non-transitory computer-readable media. Additionally, the operations of a method or algorithm may reside as one or any combination or set of codes and/or instructions on a non-transitory machine readable medium and/or non-transitory computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the following claims and the principles and novel features disclosed herein.

What is claimed is:

1. A method for processing peer transmissions within a highway communication system, comprising:
    determining a reliability of a message to be transmitted as a peer transmission within the highway communication system;
    including an indicator of the determined reliability in the message when it is transmitted; and
    assigning a priority to the message based at least in part on the determined reliability of the message, wherein the determined reliability includes an inaccuracy of measurement or identification of a method used to estimate a value reported in the message.

2. The method of claim 1, wherein:
    multiple reliability determinations are made for multiple types of information included within the message; and
    including an indicator of the determined reliability in the message when it is transmitted comprises including in the message an indication of each of the determined reliabilities for multiple types of information included within the message.

3. A method for processing peer transmissions within a highway communication system, comprising:
    receiving in a communication unit a peer transmission message within the highway communication system;
    determining a reliability of the received message;
    assigning a priority to the message based at least in part on the determined reliability of the message; and
    retransmitting the received message including an indicator of the determined reliability, wherein the determined reliability includes an inaccuracy of measurement or identification of a method used to estimate a value reported in the message.

4. The method of claim 3, further comprising:
    obtaining a reliability indicator from the received message;
    analyzing contents of the received message; and
    determining whether the contents of the received message are inconsistent with the reliability indicator obtained from the received message,
    wherein determining a reliability of the received message comprises assigning a lower reliability to the received message if the contents of the received message are inconsistent with the reliability indicator obtained from the received message.

5. The method of claim 3, wherein determining a reliability of the received message comprises determining if the filtered peer transmissions are reliable based on an age of the received message.

6. The method of claim 3, wherein determining a reliability of the received message comprises determining if the filtered peer transmissions are reliable based on a signal quality of the received message.

7. The method of claim 3, further comprising:
    receiving a value from a road side unit within the highway communication system;
    generating a random number; and
    comparing the generated random number to the received value,
    wherein retransmitting the received message is accomplished based upon results of the comparison of the generated random number to the received value.

8. The method of claim 3, wherein determining a reliability of the received message comprises determining if the filtered peer transmissions are reliable based on a signal strength of the received peer transmission.

9. The method of claim 8, further comprising calculating a distance to a transmitter of the received message, wherein determining if the filtered peer transmissions are reliable based on a signal strength of the received peer transmission comprises assigning a lower reliability to the received message if the calculated distance to the transmitter of the received message is inconsistent with the signal strength of the received peer transmission.

10. The method of claim 3, further comprising:
processing the received message according to the assigned priority.

11. The method of claim 10, wherein assigning a priority to the message comprises assigning a priority to the message based on a routing data bit, a MAC identifier or security identifier in a header of the received message.

12. The method of claim 10, wherein assigning a priority to the message comprises assigning a priority to the message based on a Doppler shift of the received peer transmission.

13. The method of claim 10, wherein assigning a priority to the message comprises assigning a priority to the message based on one or more parameters selected from the group consisting of a location of the transmitter, and an elevation of the transmitter.

14. The method of claim 10, further comprising including an indication of the priority assigned to the message in the retransmission of the message.

15. The method of claim 10, wherein processing the received message according to the assigned a priority comprises processing messages with a high assigned priority promptly and delaying processing of messages with a low assigned priority.

16. The method of claim 10, further comprising:
adjusting the assigned priority of the message based on the determined reliability of the message.

17. The method of claim 10, wherein processing the received message according to the assigned a priority comprises prioritizing processing of received messages so that messages of lower priority are processed after messages of higher priority.

18. The method of claim 17, further comprising:
adjusting the assigned priority of the message based on a proximity of a transmitter of the received peer transmission.

19. The method of claim 10, wherein the assigned priority is reflected in the manner in which the message is encoded in a transmission wave form.

20. The method of claim 19, wherein messages are transmitted in an orthogonal frequency domain multiplex access (OFDMA) wave form and high priority messages are transmitted in predefined sub-carriers, within pre-defined times within transmission frames, or both.

21. A message processing unit configured for use within a highway communication system, comprising:
a wireless transceiver; and
a processor coupled to the wireless transceiver, wherein the processor is configured with processor-executable instructions to perform operations comprising:
determining a reliability of a message to be transmitted as a peer transmission within the highway communication system;
assigning a priority to the message based at least in part on the determined reliability of the message; and
including an indicator of the determined reliability in the message when it is transmitted, wherein the determined reliability includes an inaccuracy of measurement or identification of a method used to estimate a value reported in the message.

22. The message processing unit of claim 21, wherein the processor is configured with processor-executable instructions to perform operations such that:
multiple reliability determinations are made for multiple types of information included within the message; and
including an indicator of the determined reliability in the message when it is transmitted comprises including in the message an indication of each of the determined reliabilities for multiple types of information included within the message.

23. A message processing unit for processing peer transmissions within a highway communication system, comprising:
a wireless transceiver; and
a processor coupled to the wireless transceiver, wherein the processor is configured with processor-executable instructions to perform operations comprising:
receiving in a communication unit a peer transmission message;
determining a reliability of the received message;
assigning a priority to the message based at least in part on the determined reliability of the message; and
retransmitting the received message including an indicator of the determined reliability, wherein the determined reliability includes an inaccuracy of measurement or identification of a method used to estimate a value reported in the message.

24. The message processing unit of claim 23, wherein the processor is configured with processor-executable instructions to perform operations further comprising:
obtaining a reliability indicator from the received message;
analyzing contents of the received message; and
determining whether the contents of the received message are inconsistent with the reliability indicator obtained from the received message,
wherein determining a reliability of the received message comprises assigning a lower reliability to the received message if the contents of the received message are inconsistent with the reliability indicator obtained from the received message.

25. The message processing unit of claim 23, wherein the processor is configured with processor-executable instructions to perform operations such that determining a reliability of the received message comprises determining if the filtered peer transmissions are reliable based on an age of the received message.

26. The message processing unit of claim 23, wherein the processor is configured with processor-executable instructions to perform operations such that determining a reliability of the received message comprises determining if the filtered peer transmissions are reliable based on a signal quality of the received message.

27. The message processing unit of claim 23, wherein the processor is configured with processor-executable instructions to perform operations further comprising:
receiving a value from a road side unit within the highway communication system;
generating a random number; and
comparing the generated random number to the received value,
wherein retransmitting the received message is accomplished based upon results of the comparison of the generated random number to the received value.

28. The message processing unit of claim 23, wherein the processor is configured with processor-executable instructions to perform operations such that determining a reliability of the received message comprises determining if the filtered peer transmissions are reliable based on a signal strength of the received peer transmission.

29. The message processing unit of claim 28, wherein the processor is configured with processor-executable instructions to perform operations further comprising calculating a distance to a transmitter of the received message, wherein the processor is configured with processor-executable instructions to perform operations such that determining if the filtered peer transmissions are reliable based on a signal strength of the received peer transmission comprises assigning a lower reliability to the received message if the calculated distance to the transmitter of the received message is inconsistent with the signal strength of the received peer transmission.

30. The message processing unit of claim 23, wherein the processor is configured with processor-executable instructions to perform operations further comprising:
processing the received message according to the assigned priority.

31. The message processing unit of claim 30, wherein the processor is configured with processor-executable instructions to perform operations such that assigning a priority to the message comprises assigning a priority to the message based on a routing data bit, a MAC identifier or security identifier in a header of the received message.

32. The message processing unit of claim 30, wherein the processor is configured with processor-executable instructions to perform operations such that assigning a priority to the message comprises assigning a priority to the message based on a Doppler shift of the received peer transmission.

33. The message processing unit of claim 30, wherein the processor is configured with processor-executable instructions to perform operations such that assigning a priority to the message comprises assigning a priority to the message based on one or more parameters selected from the group consisting of a location of the transmitter, and an elevation of the transmitter.

34. The message processing unit of claim 30, wherein the processor is configured with processor-executable instructions to perform operations further comprising including an indication of the priority assigned to the message in the retransmission of the message.

35. The message processing unit of claim 30, wherein the processor is configured with processor-executable instructions to perform operations such that processing the received message according to the assigned a priority comprises processing messages with a high assigned priority promptly and delaying processing of messages with a low assigned priority.

36. The message processing unit of claim 30, wherein the processor is configured with processor-executable instructions to perform operations further comprising:
adjusting the assigned priority of the message based on the determined reliability of the message.

37. The message processing unit of claim 30, wherein the processor is configured with processor-executable instructions to perform operations such that processing the received message according to the assigned a priority comprises prioritizing processing of received messages so that messages of lower priority are processed after messages of higher priority.

38. The message processing unit of claim 37, wherein the processor is configured with processor-executable instructions to perform operations further comprising:
adjusting the assigned priority of the message based on a proximity of a transmitter of the received peer transmission.

39. The message processing unit of claim 30, wherein the assigned priority is reflected in the manner in which the message is encoded in a transmission wave form.

40. The message processing unit of claim 39, wherein messages are transmitted in an orthogonal frequency domain multiplex access (OFDMA) wave form and high priority messages are transmitted in predefined sub-carriers, within pre-defined times within transmission frames, or both.

41. A message processing unit configured for use within a highway communication system, comprising:
means for determining a reliability of a message to be transmitted as a peer transmission within the highway communication system;
means for assigning a priority to the message based at least in part on the determined reliability of the message; and
means for including an indicator of the determined reliability in the message when it is transmitted, wherein the means for determining the reliability includes a means for determining an inaccuracy of measurement or a means for identifying a method used to estimate a value reported in the message.

42. The message processing unit of claim 41, wherein:
means for determining a reliability of a message to be transmitted as a peer transmission within the highway communication system comprises means for making multiple reliability determinations for multiple types of information included within the message; and
means for including an indicator of the determined reliability in the message when it is transmitted comprises means for including in the message an indication of each of the determined reliabilities for multiple types of information included within the message.

43. A message processing unit for processing peer transmissions within a highway communication system, comprising:
means for receiving in a communication unit a peer transmission message;
means for determining a reliability of the received message;
means for assigning a priority to the message based at least in part on the determined reliability of the message; and
means for retransmitting the received message including an indicator of the determined reliability, wherein the means for determining the reliability includes a means for determining an inaccuracy of measurement or a means for identifying a method used to estimate a value reported in the message.

44. The message processing unit of claim 43, further comprising:
means for obtaining a reliability indicator from the received message;
means for analyzing contents of the received message; and
means for determining whether the contents of the received message are inconsistent with the reliability indicator obtained from the received message,
wherein means for determining a reliability of the received message comprises means for assigning a lower reliability to the received message if the contents of the received message are inconsistent with the reliability indicator obtained from the received message.

45. The message processing unit of claim 43, wherein means for determining a reliability of the received message comprises means for determining if the filtered peer transmissions are reliable based on an age of the received message.

46. The message processing unit of claim 43, wherein means for determining a reliability of the received message comprises means for determining if the filtered peer transmissions are reliable based on a signal quality of the received message.

47. The message processing unit of claim 43, further comprising:
means for receiving a value from a road side unit within the highway communication system;
means for generating a random number; and means for comparing the generated random number to the received value, wherein means for retransmitting the received message comprises means for determining whether to retransmit the received message based upon results of the comparison of the generated random number to the received value.

48. The message processing unit of claim 43, wherein means for determining a reliability of the received message comprises means for determining if the filtered peer transmissions are reliable based on a signal strength of the received peer transmission.

49. The message processing unit of claim 48, further comprising means for calculating a distance to a transmitter of the received message, wherein means for determining if the filtered peer transmissions are reliable based on a signal strength of the received peer transmission comprises means for assigning a lower reliability to the received message if the calculated distance to the transmitter of the received message is inconsistent with the signal strength of the received peer transmission.

50. The message processing unit of claim 43, further comprising:

means for processing the received message according to the assigned priority.

51. The message processing unit of claim 50, wherein means for assigning a priority to the message comprises means for assigning a priority to the message based on a routing data bit, a MAC identifier or security identifier in a header of the received message.

52. The message processing unit of claim 50, wherein means for assigning a priority to the message comprises means for assigning a priority to the message based on a Doppler shift of the received peer transmission.

53. The message processing unit of claim 50, wherein means for assigning a priority to the message comprises means for assigning a priority to the message based on one or more parameters selected from the group consisting of a location of the transmitter, and an elevation of the transmitter.

54. The message processing unit of claim 50, further comprising means for including an indication of the priority assigned to the message in the retransmission of the message.

55. The message processing unit of claim 50, wherein means for processing the received message according to the assigned a priority comprises means for processing messages with a high assigned priority promptly and delaying processing of messages with a low assigned priority.

56. The message processing unit of claim 50, further comprising:

means for adjusting the assigned priority of the message based on the determined reliability of the message.

57. The message processing unit of claim 50, wherein means for processing the received message according to the assigned a priority comprises means for prioritizing processing of received messages so that messages of lower priority are processed after messages of higher priority.

58. The message processing unit of claim 57, further comprising:

means for adjusting the assigned priority of the message based on a proximity of a transmitter of the received peer transmission.

59. The message processing unit of claim 50, wherein the assigned priority is reflected in the manner in which the message is encoded in a transmission wave form.

60. The message processing unit of claim 59, wherein messages are transmitted in an orthogonal frequency domain multiplex access (OFDMA) wave form and high priority messages are transmitted in predefined sub-carriers, within pre-defined times within transmission frames, or both.

61. A non-transitory processor-readable medium having stored thereon processor executable instructions are configured to cause a processor of a message processing unit configured for use within a highway communication system to perform operations comprising:

determining a reliability of a message to be transmitted as a peer transmission within the highway communication system;

assigning a priority to the message based at least in part on the determined reliability of the message; and including an indicator of the determined reliability in the message when it is transmitted, wherein the determined reliability includes an inaccuracy of measurement or identification of a method used to estimate a value reported in the message.

62. The non-transitory processor-readable medium of claim 61, wherein the stored processor-executable instructions are configured to cause a processor of a message processing unit to perform operations such that:

multiple reliability determinations are made for multiple types of information included within the message; and including an indicator of the determined reliability in the message when it is transmitted comprises including in the message an indication of each of the determined reliabilities for multiple types of information included within the message.

63. A non-transitory processor-readable medium having stored thereon processor executable instructions are configured to cause a processor of a message processing unit for processing peer transmissions within a highway communication system to perform operations comprising:

receiving in a communication unit a peer transmission message;

determining a reliability of the received message;

assigning a priority to the message based at least in part on the determined reliability of the message; and retransmitting the received message including an indicator of the determined reliability, wherein the determined reliability includes an inaccuracy of measurement or identification of a method used to estimate a value reported in the message.

64. The non-transitory processor-readable medium of claim 63, wherein the stored processor-executable instructions are configured to cause a processor of a message processing unit to perform operations further comprising:

obtaining a reliability indicator from the received message;

analyzing contents of the received message; and determining whether the contents of the received message are inconsistent with the reliability indicator obtained from the received message, wherein determining a reliability of the received message comprises assigning a lower reliability to the received message if the contents of the received message are inconsistent with the reliability indicator obtained from the received message.

65. The non-transitory processor-readable medium of claim 63, wherein the stored processor-executable instructions are configured to cause a processor of a message processing unit to perform operations such that determining a reliability of the received message comprises determining if the filtered peer transmissions are reliable based on an age of the received message.

66. The non-transitory processor-readable medium of claim 63, wherein the stored processor-executable instructions are configured to cause a processor of a message processing unit to perform operations such that determining a reliability of the received message comprises determining if the filtered peer transmissions are reliable based on a signal quality of the received message.

67. The non-transitory processor-readable medium of claim 63, wherein the stored processor-executable instructions are configured to cause a processor of a message processing unit to perform operations further comprising:
receiving a value from a road side unit within the highway communication system;
generating a random number; and
comparing the generated random number to the received value,
wherein retransmitting the received message is accomplished based upon results of the comparison of the generated random number to the received value.

68. The non-transitory processor-readable medium of claim 63, wherein the stored processor-executable instructions are configured to cause a processor of a message processing unit to perform operations such that determining a reliability of the received message comprises determining if the filtered peer transmissions are reliable based on a signal strength of the received peer transmission.

69. The non-transitory processor-readable medium of claim 68, wherein the stored processor-executable instructions are configured to cause a processor of a message processing unit to perform operations further comprising calculating a distance to a transmitter of the received message,
wherein the stored processor-executable instructions are configured to cause a processor of a message processing unit to perform operations such that determining if the filtered peer transmissions are reliable based on a signal strength of the received peer transmission comprises assigning a lower reliability to the received message if the calculated distance to the transmitter of the received message is inconsistent with the signal strength of the received peer transmission.

70. The non-transitory processor-readable medium of claim 63, wherein the stored processor-executable instructions are configured to cause a processor of a message processing unit to perform operations further comprising:
processing the received message according to the assigned priority.

71. The non-transitory processor-readable medium of claim 70, wherein the stored processor-executable instructions are configured to cause a processor of a message processing unit to perform operations such that assigning a priority to the message comprises assigning a priority to the message based on a routing data bit, a MAC identifier or security identifier in a header of the received message.

72. The non-transitory processor-readable medium of claim 70, wherein the stored processor-executable instructions are configured to cause a processor of a message processing unit to perform operations such that assigning a priority to the message comprises assigning a priority to the message based on a Doppler shift of the received peer transmission.

73. The non-transitory processor-readable medium of claim 70, wherein the stored processor-executable instructions are configured to cause a processor of a message processing unit to perform operations such that assigning a priority to the message comprises assigning a priority to the message based on one or more parameters selected from the group consisting of a location of the transmitter, and an elevation of the transmitter.

74. The non-transitory processor-readable medium of claim 70, wherein the stored processor-executable instructions are configured to cause a processor of a message processing unit to perform operations further comprising including an indication of the priority assigned to the message in the retransmission of the message.

75. The non-transitory processor-readable medium of claim 70, wherein the stored processor-executable instructions are configured to cause a processor of a message processing unit to perform operations such that processing the received message according to the assigned a priority comprises processing messages with a high assigned priority promptly and delaying processing of messages with a low assigned priority.

76. The non-transitory processor-readable medium of claim 70, wherein the stored processor-executable instructions are configured to cause a processor of a message processing unit to perform operations further comprising:
adjusting the assigned priority of the message based on the determined reliability of the message.

77. The non-transitory processor-readable medium of claim 70, wherein the stored processor-executable instructions are configured to cause a processor of a message processing unit to perform operations such that processing the received message according to the assigned a priority comprises prioritizing processing of received messages so that messages of lower priority are processed after messages of higher priority.

78. The non-transitory processor-readable medium of claim 77, wherein the stored processor-executable instructions are configured to cause a processor of a message processing unit to perform operations further comprising:
adjusting the assigned priority of the message based on a proximity of a transmitter of the received peer transmission.

79. The non-transitory processor-readable medium of claim 70, wherein the assigned priority is reflected in the manner in which the message is encoded in a transmission wave form.

80. The non-transitory processor-readable medium of claim 79, wherein messages are transmitted in an orthogonal frequency domain multiplex access (OFDMA) wave form and high priority messages are transmitted in predefined subcarriers, within pre-define times within transmission frames, or both.

* * * * *